United States Patent
Takiguchi (10) Patent No.: US 7,606,408 B2
(45) Date of Patent: Oct. 20, 2009

(54) MAGNETIC INK CHARACTER READING METHOD AND PROGRAM

(75) Inventor: Yuji Takiguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 922 days.

(21) Appl. No.: 11/156,385

(22) Filed: Jun. 20, 2005

(65) Prior Publication Data

US 2005/0281449 A1    Dec. 22, 2005

(30) Foreign Application Priority Data

Jun. 21, 2004    (JP) .............................. 2004-182457

(51) Int. Cl.
*G06K 9/00* (2006.01)
*G06Q 40/00* (2006.01)
*G07G 1/00* (2006.01)

(52) U.S. Cl. ........................... 382/139; 235/15; 235/53; 235/379; 705/39; 705/42; 705/45; 902/37; 902/40

(58) Field of Classification Search ................. 382/100, 382/135–140; 235/15, 53, 379; 705/39, 705/42, 45; 902/37, 40
See application file for complete search history.

(56) References Cited

U.S. PATENT DOCUMENTS

| | | | | |
|---|---|---|---|---|
| 3,092,809 A | * | 6/1963 | Merritt et al. ................. | 382/139 |
| 3,212,058 A | * | 10/1965 | Sanner ........................ | 382/139 |
| 3,264,609 A | * | 8/1966 | Scheidhauer ................. | 382/139 |
| 3,432,809 A | * | 3/1969 | Reumerman et al. ......... | 382/139 |
| 3,764,978 A | * | 10/1973 | Tyburski et al. ............. | 382/318 |
| 3,764,980 A | * | 10/1973 | Dansac et al. ............... | 382/227 |
| 3,876,981 A | * | 4/1975 | Welch ......................... | 382/182 |
| 3,895,350 A | * | 7/1975 | De Vries ..................... | 382/318 |
| 3,949,363 A | * | 4/1976 | Holm .......................... | 382/140 |
| 4,201,978 A | * | 5/1980 | Nally .......................... | 382/140 |
| 4,251,799 A | * | 2/1981 | Jih .............................. | 382/174 |
| 4,315,246 A | * | 2/1982 | Milford ....................... | 382/140 |
| 4,408,342 A | * | 10/1983 | Grabowski et al. .......... | 382/140 |
| RE31,692 E | | 10/1984 | Tyburski et al. | |
| 4,510,615 A | * | 4/1985 | Rohrer ........................ | 382/139 |
| 4,555,617 A | * | 11/1985 | Brooks et al. ................ | 235/379 |
| 4,722,444 A | * | 2/1988 | Murphy et al. .............. | 209/583 |
| 5,077,805 A | * | 12/1991 | Tan ............................. | 382/137 |

(Continued)

FOREIGN PATENT DOCUMENTS

EP    0 651 345 A2    5/1995

(Continued)

*Primary Examiner*—Daniel G Mariam
*Assistant Examiner*—Manav Seth (57) ABSTRACT

A magnetic ink character reading apparatus, magnetic ink character reading method and program, and a POS terminal apparatus reduce recognition errors and thereby improve the read rate. The magnetic ink character reading apparatus reads a text string of magnetic ink characters using both a magnetic reading mechanism and optical reading mechanism to obtain magnetic ink character recognition (MICR) results and optical character recognition (OCR) results, which are compared. The OCR process is repeated if the results differ. The positions of the read character blocks are compared to find character blocks that are offset perpendicularly to the base line of the magnetic ink characters, and the OCR process is repeated. The area to which the OCR process is applied again is near the position of the offset character block corrected in the direction perpendicular to the line of magnetic ink characters to be in line with the character blocks for which the MICR result and OCR result were the same.

10 Claims, 8 Drawing Sheets

U.S. PATENT DOCUMENTS

| | | | |
|---|---|---|---|
| 5,146,512 A * | 9/1992 | Weideman et al. | 382/218 |
| 5,488,676 A * | 1/1996 | Harding, Jr. | 382/320 |
| 5,550,932 A * | 8/1996 | Blaylock et al. | 382/139 |
| 5,627,909 A * | 5/1997 | Blaylock et al. | 382/139 |
| 5,784,503 A * | 7/1998 | Bleecker et al. | 382/306 |
| 5,825,946 A * | 10/1998 | Del Signore et al. | 382/320 |
| 5,937,084 A * | 8/1999 | Crabtree et al. | 382/137 |
| 6,097,834 A * | 8/2000 | Krouse et al. | 382/137 |
| 6,654,487 B1 * | 11/2003 | Downs, Jr. | 382/139 |
| 6,863,214 B2 * | 3/2005 | Garner et al. | 235/379 |
| 6,993,211 B2 * | 1/2006 | Matsui et al. | 382/321 |
| 7,092,561 B2 * | 8/2006 | Downs, Jr. | 382/139 |
| 7,295,694 B2 * | 11/2007 | Moon et al. | 382/140 |
| 7,386,160 B2 * | 6/2008 | Prakash et al. | 382/140 |
| 7,421,107 B2 * | 9/2008 | Lugg | 382/139 |
| 7,447,347 B2 * | 11/2008 | Weber | 382/139 |
| 2003/0161523 A1 * | 8/2003 | Moon et al. | 382/139 |
| 2005/0207635 A1 * | 9/2005 | Lazar et al. | 382/139 |
| 2005/0281448 A1 * | 12/2005 | Lugg | 382/139 |

FOREIGN PATENT DOCUMENTS

| | | |
|---|---|---|
| JP | 49-49545 | 5/1974 |
| JP | 01-173271 | 7/1989 |
| JP | 03-226874 | 10/1991 |
| JP | 05-046797 | 2/1993 |
| JP | 7-182448 | 7/1995 |
| JP | 2000-259764 | 9/2000 |

* cited by examiner

MAGNETIC INK CHARACTER READING METHOD AND PROGRAM

BACKGROUND OF THE INVENTION

1. Field of the Invention

The present invention relates to a magnetic ink character reading apparatus for reading a text string generated from a sequence of magnetic ink characters on a check or other medium. The present invention also relates to a magnetic ink character reading method for reading magnetic ink characters printed on a check or other medium using a magnetic ink character reading apparatus, and to a program for achieving this magnetic ink character reading method. This invention further relates to a POS terminal having a magnetic ink character reading apparatus.

2. Description of the Related Art

Business checks and personal checks (collectively referred to below as simply checks) are commonly used to make payment in a variety of circumstances, for example, in business-to-business transactions as well as for retail purchases in stores and restaurants. Checks are particularly common in the United States and Europe. A bank code, account number, and other information are printed with magnetic ink characters at a specific position (typically a line along the bottom) on each check. When a check is used for payment in a retail store, for example, the user (checking account holder) writes the name of the payee, the check amount in both numbers and words, and then signs the check before giving the check to the store as payment for a purchase. The store can then read the bank code and account number printed in magnetic ink characters, send the read data to the bank or other financial institution or clearing house for verification, and thus know if the presented check is valid or not. If the check is valid, the store prints an endorsement on the back of the check and thus accepts the check as payment.

The bank code and account number information printed in magnetic ink characters are required to settle check payment transactions and must therefore be correctly read. If the magnetic ink characters are incorrectly recognized, transaction processing will proceed based on incorrect data, potentially resulting in major post-processing problems such as the wrong account, that is, an account other than the account on which the check is actually drawn, being debited for payment. Correctly reading the magnetic ink characters is therefore essential when processing check transactions. The character recognition technologies used in magnetic ink character recognition (MICR) readers have therefore been tweaked to improve the recognition rate and reduce character recognition errors.

Japanese Unexamined Patent Appl. Pub. S49-49545 and Japanese Unexamined Patent Appl. Pub. H7-182448 provide technologies for improving the recognition rate by also using an optical character recognition (OCR) reader to optically read characters that could not be read magnetically.

Considering the potential for erroneously recognizing the content even though the characters can be read, Japanese Unexamined Patent Appl. Pub. 2000-259764 provides technology for reducing the false recognition rate by comparing the recognition output of the MICR reader and the recognition output of the OCR reader and accepting as correct only those results that are the same.

In order to reliably read the area where the magnetic ink characters are printed, however, an area larger than the actual area of the magnetic ink characters must be read because of variations in the printing position of the magnetic ink characters, variations in check dimensions, and variations in the dimensions of the MICR reader, for example. When the area read for character recognition is thus increased, however, the signature line where the check-holder signature is written and the background pattern, for example, may encroach on the area that is read, and the OCR reader may mistakenly read the signature or background pattern around the magnetic ink characters. The signature, background pattern, and other elements that are not magnetic ink characters but may be mistakenly recognized by the OCR reader are referred to below as "noise characters."

Because these noise characters are not magnetic ink characters, the likelihood of noise characters being erroneously recognized by the MICR reader is extremely low. However, even if the MICR reader correctly reads the magnetic ink characters without being affected by these noise characters, the OCR reader could still read noise characters, resulting in recognition errors. Thus, because there is a danger of recognition errors if the reading results of the MICR reader and OCR reader differ, differences in the reading results are preferably handled as unreadable errors. Considering this possibility of content recognition errors even though the data is read correctly, using an OCR reader in addition to a MICR reader can thus conversely lower the recognition rate.

SUMMARY OF THE INVENTION

An object of the present invention is therefore to overcome the above-identified problem by providing a magnetic ink character reading apparatus, method and program that can suppress erroneous recognition of noise characters, e.g., the signature and background pattern, by the OCR reader and thus improve the read rate.

A magnetic ink character reading apparatus according to one aspect of the present invention comprises a magnetic data acquisition unit for magnetically acquiring magnetic data from a string of magnetic ink characters on a sheet-type medium; a magnetic recognition unit for recognition processing the magnetic data; an optical recognition unit for performing an optical recognition process on character recognition blocks of an image containing the string of magnetic characters, each block containing an image of one magnetic character and the character recognition blocks defining a recognition processing area; and a comparison unit for comparing a magnetic recognition result obtained from the magnetic recognition unit with a optical recognition result obtained from the optical recognition unit. When the comparison unit determines that a first magnetic recognition result and a first optical recognition result differ, the optical recognition unit identifies a re-recognition processing area offset in a direction substantially perpendicular with respect to at least a portion of the recognition processing area and performs the optical recognition process again on each character in the re-recognition processing area.

The apparatus may further include an optical data acquisition unit for optically acquiring the image containing the string of magnetic ink characters.

The apparatus may further include a position calculation unit configured to calculate the boundary of the re-recognition processing area.

The re-recognition processing area is typically in line with that portion of recognition processing area from which matching magnetic and optical recognition results were obtained, but is offset from that portion of the recognition processing area from which those results differ.

A magnetic ink character reading method according to another aspect of the invention includes the steps of acquiring magnetic data from a string of magnetic ink characters on a sheet-type medium; processing the magnetic data; optically acquiring an image containing the string of magnetic ink characters; performing optical recognition processing on character recognition blocks of the image, each block containing an image of one magnetic ink character and the blocks defining a recognition processing area; and comparing a first magnetic recognition result with a first optical recognition result. When the first magnetic and optical recognition results differ, the method further includes identifying a re-recognition processing area offset substantially perpendicularly with respect to at least a portion of the recognition processing area, and repeating the optical recognition process is repeated on each character in the re-recognition processing area.

A second optical recognition result obtained from repeating the optical recognition process on the re-recognition processing area is compared with a corresponding portion of the first magnetic recognition result.

The re-recognition processing area or second target reading area is typically in line with that portion of recognition processing area or first target reading area from which matching magnetic and optical recognition results were obtained, but is offset from that portion of the recognition processing area or first target reading area from which those results differ.

Thus, when the magnetic and optical recognition results do not match, the optical recognition process is only repeated on a re-recognition processing area that is offset from that part of the recognition processing area from which erroneous results were obtained. Because magnetic recognition and optical recognition detect different phenomena, the causes of recognition errors are also different. Therefore, if the magnetic recognition result and the optical recognition result match, there is a strong likelihood that the recognition result is correct.

Furthermore, by repeating the optical recognition process when the magnetic and optical recognition results do not match, a drop in the match rate resulting from an error in the optical recognition result even though the magnetic recognition result is correct, can be prevented. Thus, the rate of correct character recognition can be improved. In addition, by repeating the recognition process only for that part of the reading target for which the magnetic and optical recognition results were different, the match rate can be efficiently improved and the read rate can be improved.

The optical recognition process is repeated on a second reading target in which the character position is offset substantially perpendicularly with respect to the character array direction. When an error is made in optical recognition, the background pattern, part of the signature, or other noise characters may have been recognized instead of the intended magnetic ink characters. The likelihood of such noise characters being present where the magnetic ink characters are printed is low, but the likelihood of the noise characters being found in a position offset in the direction perpendicular to the direction in which the magnetic ink characters are aligned is high. Furthermore, the probability is extremely high that characters that match in both the magnetic and optical recognition results were correctly read, and the likelihood that such recognized characters are the intended magnetic ink characters is extremely high.

Therefore, if the optical recognition unit repeats the recognition process on a reading target offset perpendicularly with respect to the line of the reading target for which the recognition results of the magnetic recognition unit and the recognition results of the optical recognition unit match, a drop in the match rate resulting from recognition errors by the optical recognition unit can be suppressed, and the read rate of correctly recognized characters can be improved.

The magnetic ink character reading apparatus may include both a host apparatus and a hybrid processing apparatus that has a printing unit for printing based on data sent from the host apparatus. The hybrid processing apparatus also preferably includes the magnetic data acquisition unit and the optical data acquisition unit, while the host apparatus preferably contains at least the magnetic recognition unit, optical recognition unit, and comparison unit. Data acquired by the acquisition units is sent from the hybrid processing apparatus to the host apparatus. The host apparatus then preferably runs the various processes described above using the magnetic recognition unit, optical recognition unit, and comparison unit on the received data.

By providing a printing unit in the hybrid apparatus, a single apparatus can handle the processing of magnetic ink characters and can also print the necessary information on the front and back sides of a check presented as payment for a purchase at a POS terminal, which can include the magnetic ink character reading apparatus.

In any of its various forms, the invention improves the correct recognition rate of magnetic ink characters on a sheet-type medium.

Also, any of the methods described above may be executed on a programmable device, such as a magnetic ink character reading apparatus, in response to a set of instructions contained on a medium that is read by the device.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
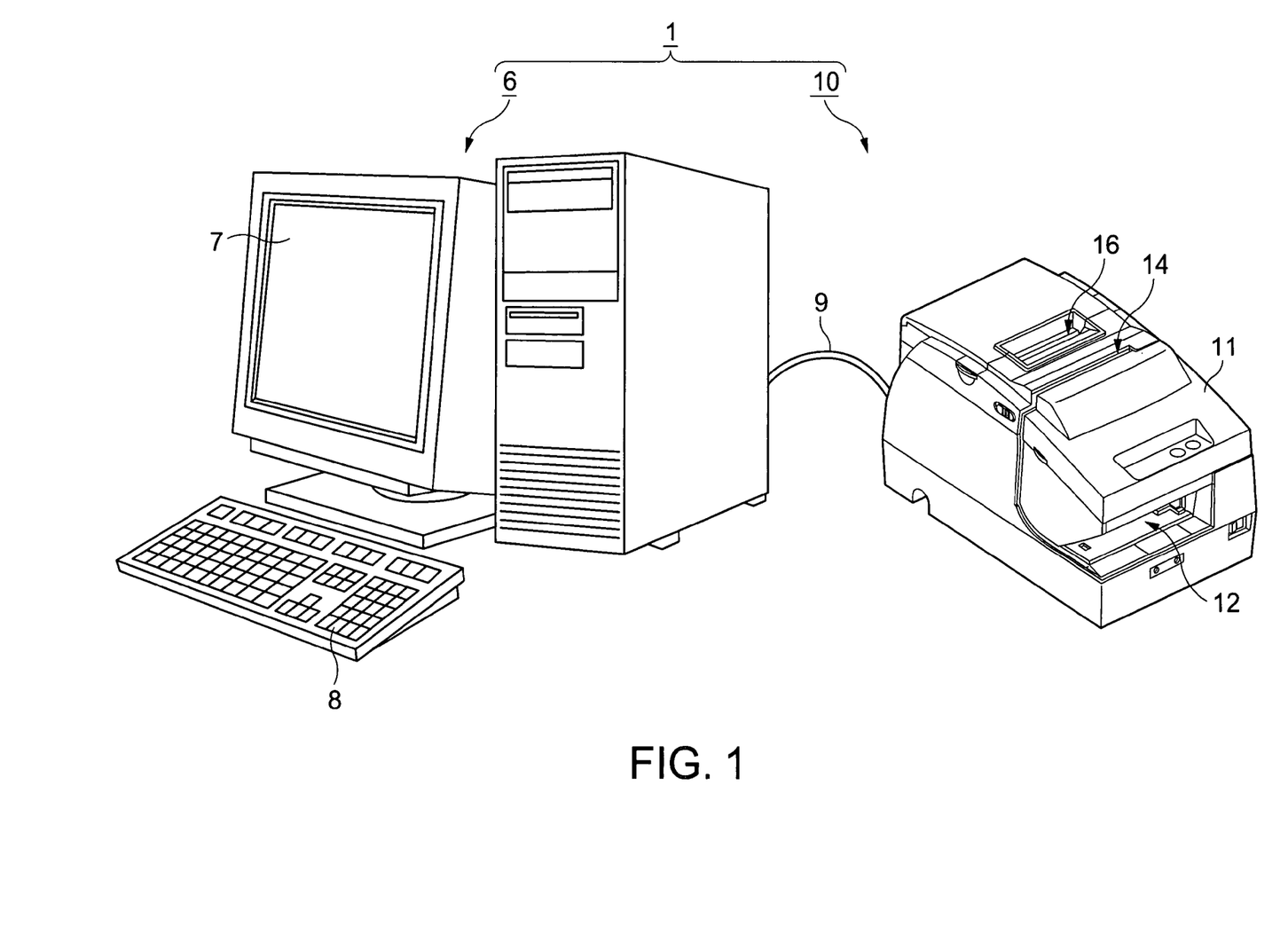
FIG. 1 is an oblique view showing a host apparatus and hybrid processing apparatus having both magnetic and optical character recognition capability according to embodiments of the present invention.
Figure 2:
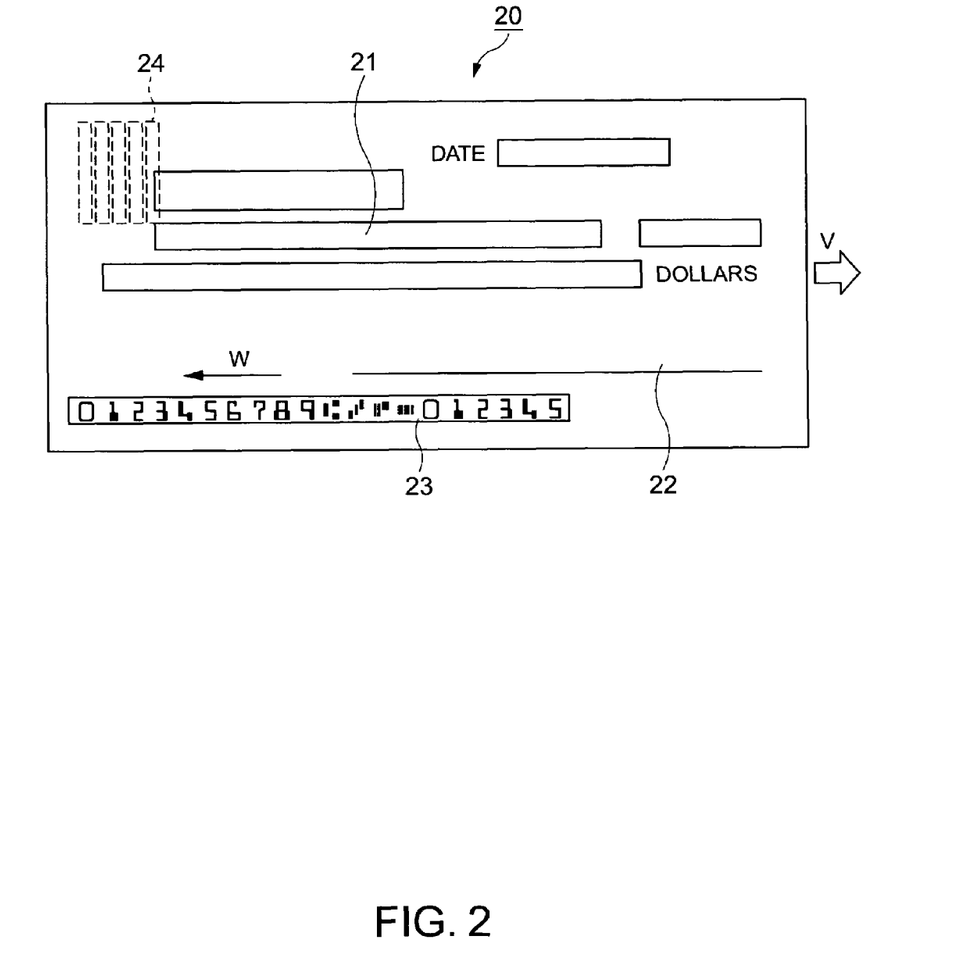
FIG. 2 is a plan view of a check used by way of example as a processed medium.

Preferred embodiments of a magnetic ink character reading apparatus according to the present invention are described below with reference to the accompanying figures. FIG. 1 is an oblique view of a host apparatus and a hybrid apparatus that includes a magnetic ink character reading (MICR) apparatus according to a first embodiment of the invention. FIG. 2 is a plan view showing the face of a check, which is used by way of example as the processed medium. To complete a check transaction, the front of the check is filled out, including the payment amount and signature, check validity is confirmed, and the check is endorsed. By providing a magnetic ink character reading apparatus in a printer, as this invention does, the entire check processing operation including reading the magnetic ink characters and printing information on the front and back of the check used in the transaction can be executed by a single machine.

The present invention relates to an apparatus and a method for reading magnetic ink character text. While this invention is most commonly used to process checks and is described below using checks as the processed medium, the invention is not limited to that specific medium; rather, the invention can also be used to process other financial instruments and documents, including cashier checks and money orders. Furthermore, while the invention does not necessarily require a printer, since the following embodiments are described in connection with processing checks, which is the most typical application of the invention, the invention is described with reference to a magnetic ink character reading apparatus 1 having a hybrid processing apparatus 10 that is capable of performing a magnetic ink character reading function, an optical reading function, and a printing function.

The host apparatus 6 shown in FIG. 1 has a display unit 7 and operating unit 8. The hybrid processing apparatus 10 shown in FIG. 1 is enclosed in a plastic cover 11, and an insertion slot 12 for manually inserting checks 20 as the processed medium is formed in the front portion of the hybrid processing apparatus 10. Checks inserted from the insertion slot 12 are discharged from the exit opening 14 formed at the top.

The hybrid processing apparatus 10 also has a roll paper compartment (not shown in the figure) formed in the back portion of apparatus 10 for holding roll paper. Roll paper housed in the roll paper compartment is conveyed past the printing unit and discharged from the roll paper exit 16 formed in the top of the apparatus. The host apparatus 6 and hybrid processing apparatus 10 communicate through a suitable communication path, e.g., by a cable 9 that electrically connects the two apparatuses.

The front of the check 20 as shown in FIG. 2 has a front printing area 21 for printing the payment information, a signature area 22 where the user signs the check, and a MICR recording area 23 where magnetic ink characters are printed. An endorsement printing area 24 for recording endorsement information is on the back of the check 20.

The payee, date, and amount are recorded in the front printing area 21. The person (customer) using the check 20 and paying for the purchase signs the check in the signature area 22. Endorsement information required by the party accepting the check 20 is recorded in the endorsement printing area 24. This endorsement information may contain a verification number for the person using the check 20, the date, and the check amount, for example. The account number and bank code for the account and bank on which the check 20 is drawn are printed in magnetic ink characters in the MICR recording area 23.

A check 20 is inserted into the insertion slot 12 in the direction indicated by arrow V in FIG. 2. The hybrid processing apparatus 10 then captures magnetic data and optical image data from the magnetic ink characters printed in the MICR recording area 23 while conveying the check 20 through the transportation path. The data sent from the hybrid processing apparatus 10 to the host apparatus 6 is processed for character recognition by the host apparatus 6. The text string of magnetic ink characters is recognized sequentially from the right end of the check as seen in FIG. 2 in the direction of arrow W.

When a customer uses a check 20 to pay for a purchase in a retail store, for example, the store clerk often prints the store name as the payee, the check amount in both numbers and words, and the date using the printing mechanism of the hybrid processing apparatus 10, and then returns the check 20 to the customer. The customer confirms that the payee and check amount printed in both numbers and words are correct, then signs and returns the check to the clerk as payment. The store then reads the bank code and account number printed in magnetic ink characters, and sends the account information to the bank or check verification clearing house to determine if the check 20 is valid. If the check is valid, the retailer prints an endorsement on the back of the check 20, and thus accepts the check as payment and completes the check 20 payment process.

The hybrid processing apparatus 10 shown in FIG. 1 reads the MICR text on the check 20 with a single scan. This single scan includes magnetically reading the magnetic ink characters using an MICR head or other magnetic reading mechanism 45, and optically imaging the characters using a scanner or other optical reading mechanism 47.

The hybrid processing apparatus 10 performs the magnetic reading and magnetic ink character recognition operations, while optical character recognition (OCR processing) of the scanned image is preferably handled by the host apparatus 6, considering the data transfer rate and processor power differences.

Figure 3:
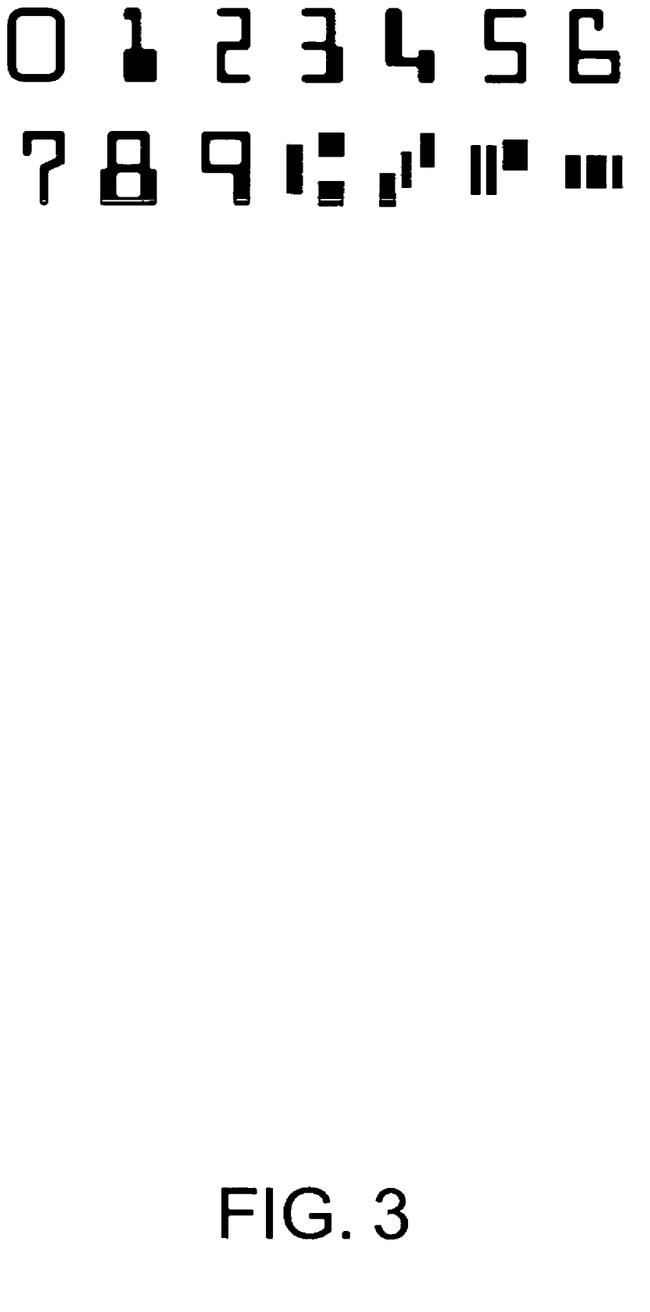
FIG. 3 is an exemplary illustration of magnetic ink characters.

FIG. 3 shows the shape of the magnetic ink characters according to one common standard. Magnetic ink characters printed in the MICR recording area 23 are read with an MICR head or equivalent mechanism. The MICR head is composed of a permanent magnet and a magnetic head. The magnetic ink contains a magnetic powder mixed with ink. As a result, the magnetic ink characters are magnetized when the check 20 passes over the permanent magnet. When the magnetized magnetic ink characters then pass over the magnetic head, the magnetic flux varies according to the shape of the magnetic ink characters, and a waveform corresponding to the shape of each character is output from the magnetic reading head. Because the shape of each magnetic ink character is determined according to a specific standard, the magnetic ink characters can be read from the waveform patterns. Common MICR character fonts are known as E13B and CMC7. The E13B font defines 14 different characters, specifically the numbers 0 to 9 and four different symbols. The magnetic ink characters shown in FIG. 3 are in the E13B font.

Figure 4:
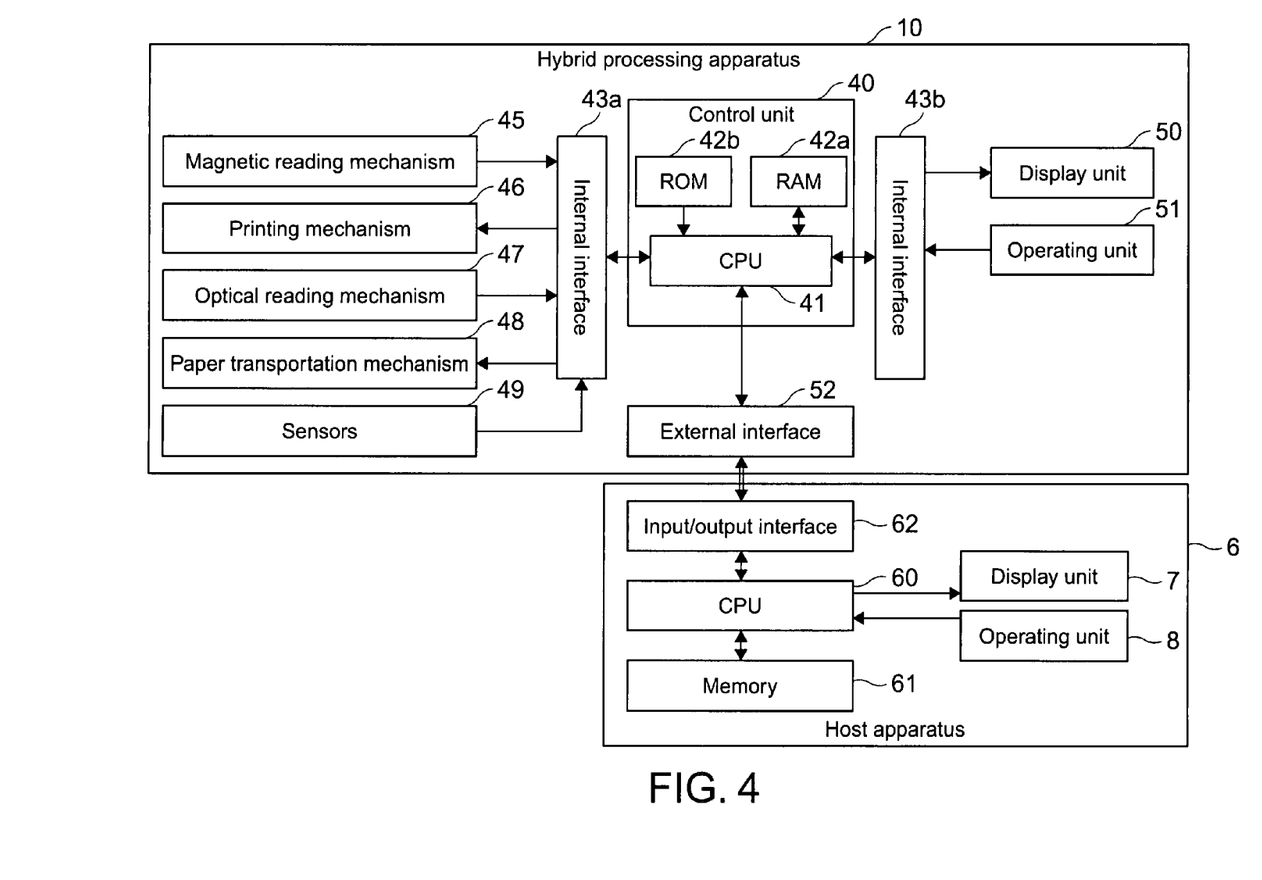
FIG. 4 is a block diagram showing the main hardware components of the hybrid processing apparatus according to embodiments of the invention.

The electrical arrangement for driving this magnetic ink character reading apparatus 1 is described next. FIG. 4 is a block diagram showing the main hardware elements of this magnetic ink character reading apparatus 1.

The control unit 40 centrally controls the operation of the other parts of the hybrid processing apparatus 10. The control unit 40 has a CPU (central processing unit) 41 for executing logic operations, RAM (random access memory) 42*a* for temporarily storing control commands and print data received from the host apparatus 6, and ROM (read-only memory) 42*b* for storing routines for the logic operations run by the CPU 41. The CPU 41, ROM 42*b*, and RAM 42*a* are electrically interconnected.

In communication with the CPU 41 through internal interface 43*a* are the magnetic reading mechanism 45, printing mechanism 46, optical reading mechanism 47, paper transportation mechanism 48, and various sensors 49. A display unit 50 and an operating unit 51 are in communication with the CPU 41 through internal interface 43*b*. The CPU 41 controls the operation of these other units based on a control program stored in ROM 42b. Each mechanism also has any necessary logic circuits needed by that mechanism.

The hybrid processing apparatus 10 is in communication with a host apparatus 6 such as the host computer of a POS terminal through an external interface 52, and operates under the control of the host apparatus 6.

The host apparatus 6 has a CPU 60 for running logic operations and controlling operation of the hybrid processing apparatus 10 and the other parts of the host apparatus 6. Communicating with the CPU 60 are memory 61 for storing control commands, print data, and a control program, display unit 7, and operating unit 8. The host apparatus 6 communicates with the hybrid processing apparatus 10 through an input/output interface 62.

Figure 5:
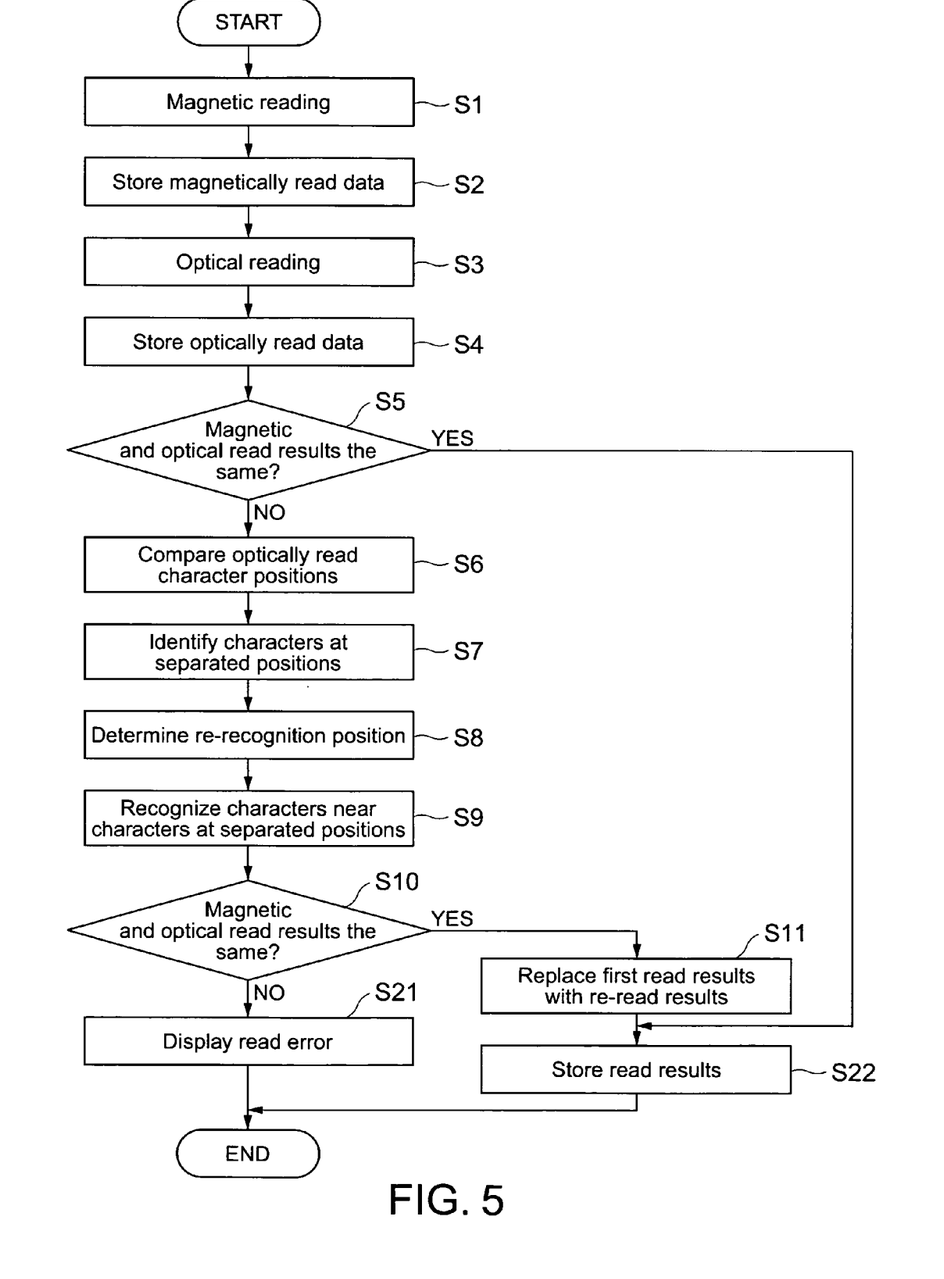
FIG. 5 is a flow chart describing a sequence of processing magnetic ink characters.

A process for reading the bank code and checking account number printed in magnetic ink characters in the MICR recording area 23 of the check 20 using the foregoing magnetic ink character reading apparatus 1 is described next below. FIG. 5 is a flow chart of a process for reading a magnetic ink character text string according to this preferred embodiment of the present invention.

A check 20 is inserted into the insertion slot 12 and then conveyed by the paper transportation mechanism 48 through the paper path. As the check 20 is conveyed, the magnetic ink characters are first read magnetically by the magnetic reading mechanism 45 (step S1). Magnetic data acquired by the magnetic reading mechanism 45 is sent to the host apparatus 6 and the CPU 60 applies a magnetic ink character recognition process to the magnetic data. The magnetic data is converted from analog to digital form, and the magnetic ink characters are extracted, smoothed, and normalized to acquire normalized data. This normalized magnetic data is then compared with corresponding reference data stored in memory 61. If the magnetic data for a particular character and the reference data for that character match within a specific tolerance range, the magnetic data is recognized as the character corresponding to the matching reference data. The location from which the magnetic data matching the reference data was extracted is also recognized as the character position of the recognized character. This recognition process is applied to all magnetic ink characters in the text string, after which the character recognition process performed by the magnetic character recognition unit ends.

Magnetic reading mechanism 45 thus performs the functions of a magnetic data acquisition unit, and CPU 60 and memory 61 perform the functions of a magnetic character recognition unit.

The characters corresponding to the reference data that match the magnetic data and the character positions are stored as the magnetic reading result in the memory 61 in step S2.

In step S3 the optical reading mechanism 47 optically scans the magnetic ink characters. More specifically, the optical reading mechanism 47 images the check 20, and the image data is sent to the host apparatus 6. The CPU 60 then extracts an image in a specified range containing the magnetic ink characters from the image data sent to the host apparatus 6, and runs an optical character recognition process to read the magnetic ink characters. The optical reading mechanism 47 corresponds to an optical data acquisition unit, and the CPU 60 and memory 61 are equivalent to an optical character recognition unit. The optical reading mechanism 47, CPU 60, and memory 61 compose an optical character recognition apparatus that compares the scanned images with a specific template. If the image data for a particular character and template data for that character match within a specific tolerance range, the image data is recognized as the character represented by the template.

Figure 6A:
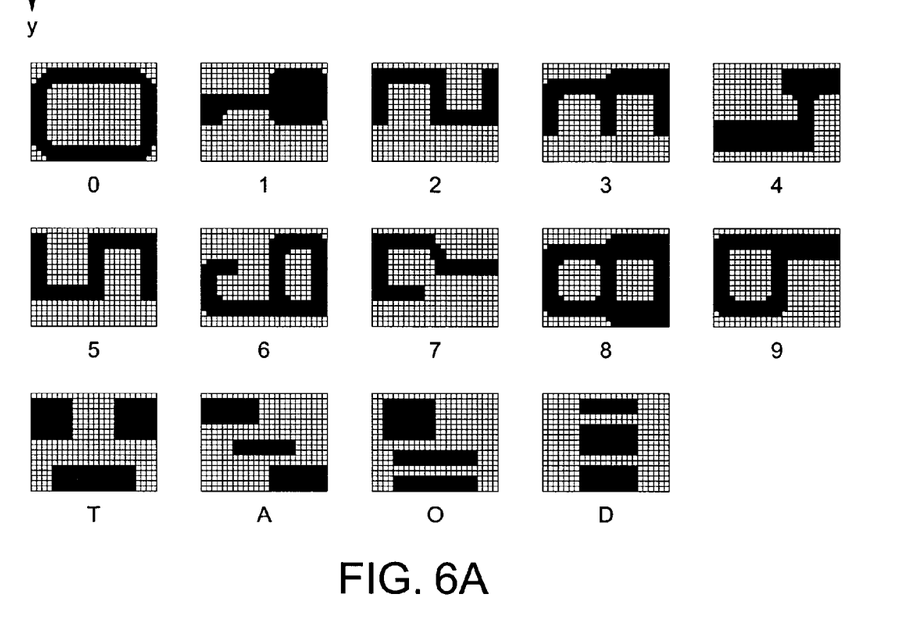
FIG. 6A shows templates of various magnetic ink characters.
Figure 6B:
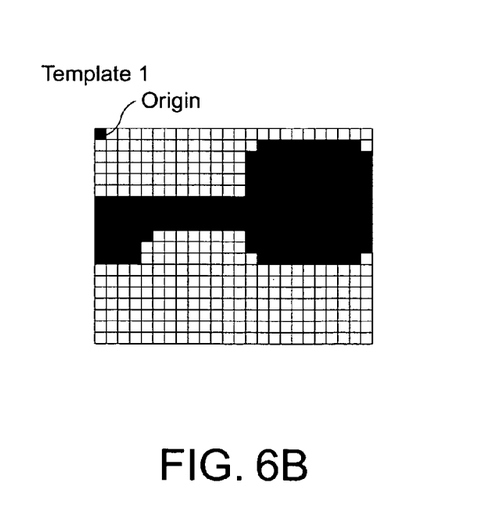
FIG. 6B shows an enlarged view of the template for the number one.

FIG. 6 shows an example of the template data. FIG. 6A shows templates for recognizing characters in the E13B font shown in FIG. 3. FIG. 6B is an enlarged view of the template for the number "1." For purposes of description below, the character height is along the x-axis and character width is thus denoted on the y-axis perpendicular to the x-axis. The same xy-axis is used in FIG. 7.

Each character template is 24 dots high along the x-axis and 19 dots wide along the y-axis, and thus consists of 456 dots. The dots are black or white, and the shape of the set of black dots is the shape of the character. Each template has a fixed origin as indicated in FIG. 6B, and the area measuring 24 dots high along the x-axis and 19 dots wide along the y-axis counted from and including the origin is the area (size) of one character.

Figure 7:
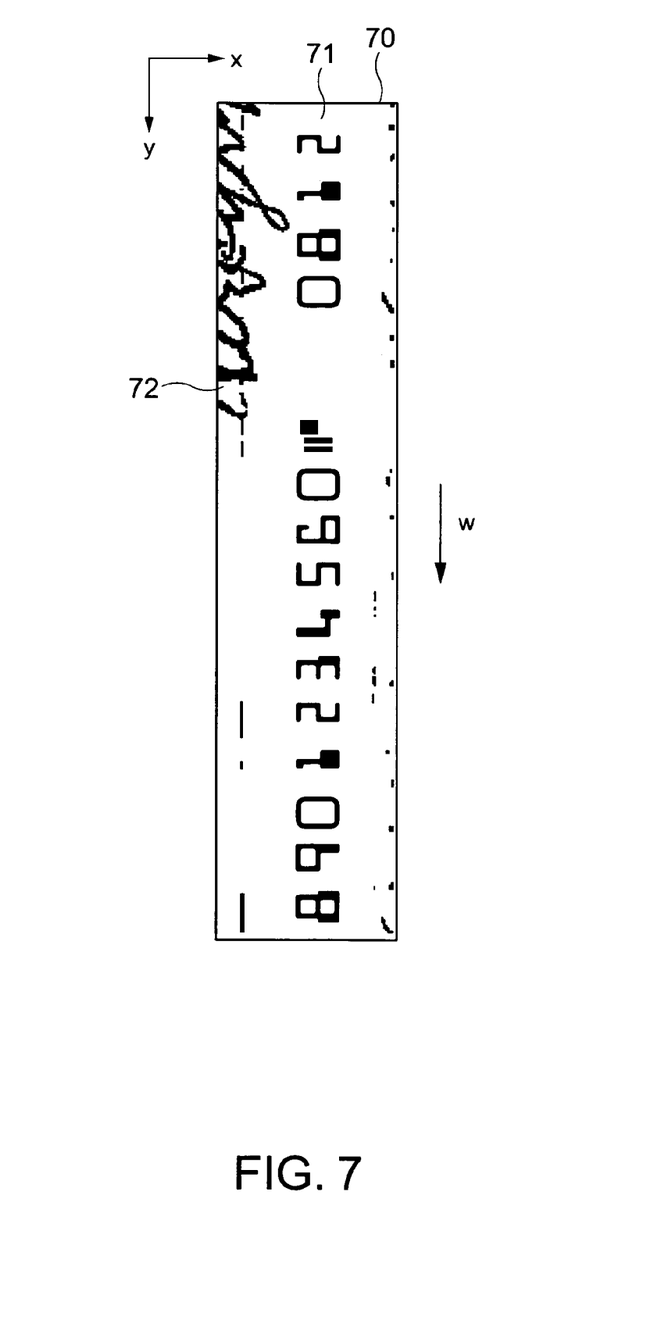
FIG. 7 shows an example of an extracted image containing a sequence of magnetic ink characters.

FIG. 7 shows an example of the extracted image. The area including the extracted image 70 is set to contain the MICR recording area 23, which is known from a standard. Considering possible variation in the position of the MICR recording area 23, the extracted image 70 is sufficiently larger than the size of the actual MICR image 71, which is the image of the MICR recording area 23. Because an area sufficiently larger than the desired MICR image 71 is extracted, the extracted image 70 also contains a portion of the signature image 72, which is an image of the signature of the person that signed the check 20. As noted above, the character height is along the x-axis and the character string is spaced along the y-axis perpendicular to the x-axis. The direction of arrow W is also the same as the direction of arrow W in FIG. 2.

To compare the scanned character images with the templates, the extracted image 70 is segmented in the y-axis direction into matching areas of a size equal to one character in the MICR image 71. A comparison area measuring 24 dots on the x-axis and 19 dots on the y-axis in each matching area is compared with the 14 templates to calculate the mismatch rate of the black and white dots relative to the 456 dots in each comparison area.

The first comparison area compared with the templates to determine the mismatch rate is the area measuring 24 dots on the x-axis and 19 dots on the y-axis starting from the left end of the extracted image 70 as seen in FIG. 7. The area compared with the templates is the area measuring 24 dots on the x-axis and 19 dots on the y-axis offset one dot in the x-axis direction. The comparison area is thereafter likewise shifted one dot on the x-axis and compared with each of the 14 templates until the right side of the comparison area coincides with the right end of the matching area shown in FIG. 7, and the mismatch rate is determined for each of the comparison areas.

If the mismatch rate is within a specific limit, the character represented by the template for which the mismatch rate is within the specific limit is recognized as the printed character, and the position of the comparison area having the mismatch rate within the specific limit is recognized as the character position. Note that the character position is referenced to the location of the origin of the template. If the mismatch rate is within the specific limit for a plurality of comparison areas, or if the mismatch rate between a comparison area and a plurality of templates is within the specific limit, the position of the comparison area having the lowest mismatch rate and the character of the corresponding template are recognized as the character position and character recognized for that matching area. When the recognition process ends for one matching area, the same recognition process is applied to the next matching area.

The matching area to which the recognition process is first applied is the matching area along the top edge of the extracted image 70 as seen in FIG. 7. The matching area to which the recognition process is applied next is the matching area adjacent to the matching area that was read first.

The recognition process thus continues through the matching area at the bottom edge of the extracted image 70 in FIG. 7, after which the character recognition process of the optical character recognition unit ends.

The character positions and characters recognized in each matching area are stored in memory 61 as the optical recognition result in step S4 in FIG. 5.

Whether the stored characters in the MICR recognition result are the same as the stored characters in the OCR result is then determined in step S5. If the characters from the OCR result and characters from the MICR result are the same (step S5 returns yes), the character string printed in magnetic ink characters in the MICR recording area 23 is determined to have been correctly read, and control advances to step S22. The reading results that are the same in the OCR results and MICR results are then stored as the reading result to memory 61 in step S22, and reading the text string printed in the MICR recording area 23 ends.

If the characters from the OCR result and the characters from the MICR result are not the same (step S5 returns no), the text string may have not been correctly read by the optical reading mechanism and control therefore goes to step S6.

Figure 8A:
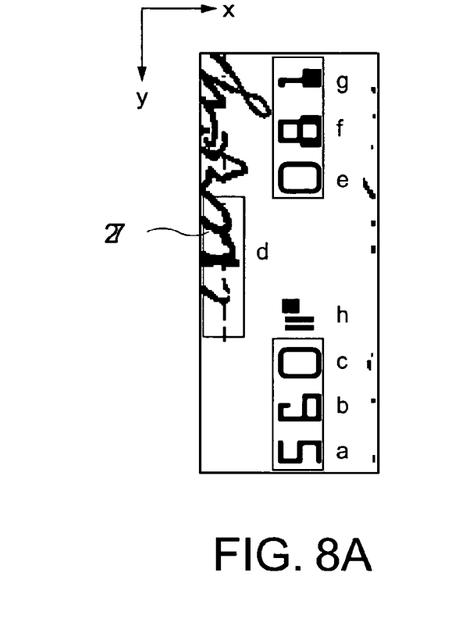
FIGS. 8A and 8B show selected parts of the extracted image.
Figure 8B:
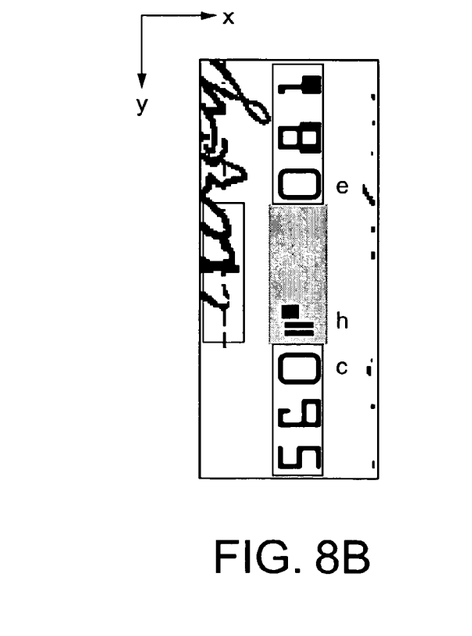

The character positions of the characters recognized by the CPU 60 are compared in step S6. This is described more specifically with reference to FIG. 8, which shows part of the extracted image.

More particularly, FIG. 8 shows part of the extracted image 70 shown in FIG. 7 with reference letters a to h denoting the character recognition blocks.

Note that if [X] denotes a blank space and "#" denotes a non-numeric symbol, the correctly read text string is "560#[X][X]081". The following description assumes that the MICR reader correctly recognized the characters and the MICR result is therefore "560#[X][X]081".

The CPU 60 applies the recognition process from the top end of the extracted image as seen in FIG. 8, recognizes the characters in character recognition blocks g, f, e, and then mistakenly recognizes the image in recognition block d, which is part of the signature image 72, as the number "1." Because the position of recognition block d and the position of recognition block h in the y-axis direction in FIG. 8 are closer than the width of the above-noted matching area in the same y-axis direction, the symbol in recognition block h is not correctly recognized and is therefore ignored, and recognition block c is therefore processed and recognized after processing recognition block d. Part of the signature is present between recognition block e and recognition block d, but because there is no matching template, the CPU 60 recognizes this area as blank space where no magnetic ink characters are present. As a result, the character string in the OCR result recognized by the CPU 60 is "5601[X]081".

The character position comparison sequentially compares the character positions of adjacent recognition blocks and compares the offset therebetween in the x-axis direction. More specifically, the character position of recognition block a in FIG. 8A is used as a reference point. The position of block a is then compared with the position of block b, and the x-axis offset therebetween is determined. If this offset is less than a specified number of dots, block b is recognized as not being offset from block a, and block b is put into the same character block as recognition block a. If this offset is greater than a specified number of dots, block b is recognized as being offset from block a, and block b is put into a new character block different from the character block in which recognition block a is included. In the example shown in FIG. 8 character recognition blocks b and a are both in the same character block. The same process is applied to character recognition block c, which is thus determined to be in the same character block as recognition block b, and thus in the same block as recognition block a.

Block d, however, is offset from the line of characters. When the character position of block d is compared with the character position of block c, the offset exceeds the specified number of dots; thus block d is put into a new character block separate from the character block containing block c.

Block e is in line with the line of magnetic ink characters. When the character position of block e is compared with the character position of block d, the offset is known to exceed the specified number of dots, and block e is thus put into a new character block separate from the character block containing block d. Because recognition block e is in a new character block separate from block d, the blank space between block e and block d is included in the same character block as block d.

The character positions of recognition blocks f and g are likewise compared and blocks f and g are thus also included in the same character block as recognition block e. Character recognition reading is thus segmented into three blocks in this example: character block abc, character block d, and character block efg.

The specific number of dots used to determine the foregoing offset is 35 dots, which is the 24 dot width in the x-axis of the templates plus an allowance for image skewing.

Characters (recognition blocks) at separate x-axis positions are identified next in step S7. In this example recognition block d in the center character block where there is no match between the OCR result and the MICR result is recognized as a character at a position separated on the x-axis and thus an incorrectly recognized character.

A position to which the recognition process is applied again is then determined in step S8. The position to which the recognition process is applied again is determined based on the character position of the recognition block located at the edge of the character block adjacent to the block containing the recognition image determined to be positioned separately from the other blocks. In this embodiment of the invention the re-recognition area is referenced to the positions of block c and block e. The y-axis range of the area on which the recognition process is repeated is set to the area between block c and block e, that is, to the range of the character block containing the recognition block d that was misread. The x-axis range of the area on which the recognition process is repeated is set to the x-axis width of block c or block e plus a correction allowance.

Considering variations in the size of the magnetic ink characters and variations in the printing position, this correction allowance adds 4 dots to the x-axis width on both sides of block c and block e. Note that variation in the printing position as used here refers to variation in the spacing between the magnetic ink characters in the text string. Variation in the printing position used to determine the range of the extracted image 70 refers to variation in the printing position of the line of text on the check 20, compared to which the variation in the spacing between magnetic ink characters is extremely small. The re-recognition area (re-recognition position) thus determined in this example is the shaded area shown in FIG. 8B.

The CPU 60 then repeats the recognition process in step S9 on the area determined in step S8, that is, the shaded area shown in FIG. 8B in this example. This shaded area contains recognition block h, which was ignored during the first recognition process because block d containing the erroneously recognized character was processed instead. Note also that block d is not contained in the area processed in this second pass. The likelihood that the result from the first recognition process will be repeated in this second pass is substantially zero, and the likelihood of correct recognition is thus extremely high. The time required for comparison with the templates is also significantly less than in the first pass of the recognition process because the x-axis width of the range processed in the second pass is significantly narrower than the x-axis width of the extracted image 70 that was character recognition processed in the first pass.

The characters recognized in this second pass of the recognition process are then compared with the characters from the previous recognition process stored in memory 61 to determine if they are the same. If the result from this second recognition process differs from the MICR result (step S10 returns no), control goes to step S21.

If the OCR result and MICR result do not match even after the recognition process is repeated as described above (step S10 therefore returns no), the likelihood is high that the text cannot be correctly read, and the check is preferably processed as unreadable. A reading failure error is therefore presented on the display unit 7 of the host apparatus 6 in step S21, and reading the characters printed in the MICR recording area 23 ends.

If the characters read in the second pass of the recognition process are determined to be the same as the characters from the MICR result stored in memory 61 (step S10 returns yes), the characters printed in magnetic ink in the MICR recording area 23 are determined to have been correctly read, and control goes to step S11. In step S11 the characters from the OCR result stored in memory 61 are replaced with the characters recognized in the second pass of the recognition process.

The reading results that matched in the OCR process and MICR process are then stored as the character recognition result in step S22, and reading the text string printed in the MICR recording area 23 ends.

This preferred embodiment of the present invention thus affords the following benefits.

(1) If the characters recognized in the MICR process and the characters recognized in the OCR process do not match, the CPU 60, which acts as the optical character recognition unit, runs the recognition process again. Repeating the character recognition process can thus prevent a drop in the recognition rate resulting from OCR errors even though the MICR results are correct, and can thus improve the correct recognition rate.

(2) By repeating the recognition process only for that part where the MICR result and the OCR result do not match, when the characters recognized by the MICR process and the characters recognized by the OCR process are different, the recognition rate can be efficiently improved and the correct read rate can be improved.

While the invention has been described and illustrated in the context of the foregoing embodiments, the invention is not limited to these embodiments. Rather, many variations, which will be apparent to those skilled in the art in light of the foregoing, are possible. Such variations are intended as part of the invention to the extent they fall within the spirit and scope of the accompanying claims. Some examples of such variations are described below.

Variation 1: The recognition process is run on a host apparatus 6 that is separate from the hybrid processing apparatus 10 composed of a magnetic reading mechanism 45, printing mechanism 46, and optical reading mechanism 47 in the foregoing embodiment of the invention, but a CPU for running the recognition process is not necessarily rendered discretely. More specifically, the CPU 41 or control unit 40 inside the hybrid processing apparatus 10 could run the recognition process. Furthermore, the host apparatus 6 could be a host device dedicated to the magnetic ink character reading apparatus, a POS terminal, or other type of host device.

Variation 2: The printing mechanism can have a dot impact print head for transferring ink from an ink ribbon to the check 20. Alternatively, an ink-jet head or other type of print head could be used.

Variation 3: The reading process ends after storing the reading results in the foregoing embodiment, but the reading results could be verified after the reading process instead of immediately ending the reading process.

Variation 4: The reading process ends after storing the reading results in the foregoing embodiment, but the reading results could be presented on the display unit after the reading process instead of immediately ending the reading process.

Variation 5: A read failure error is displayed on the display unit of the host apparatus 6 in the foregoing embodiment, but the error could be displayed on the display unit of the hybrid processing apparatus instead.

Variation 6: The functions of the present invention are achieved in software using the CPU 60 in the foregoing embodiment, but if these functions can be achieved by means of a discrete electronic circuit device without using a logic processor, such an electronic circuit device can be used instead.

The invention is intended to include other variations, modifications or changes to the extent they fall within the spirit and scope of the appended claims.

What is claimed is:

1. A magnetic ink character reading apparatus, comprising:
    a magnetic data acquisition unit configured to acquire magnetic data from a string of magnetic ink characters on a sheet-type medium;
    a magnetic recognition unit configured to process the magnetic data;
    an optical recognition unit configured to perform an optical recognition process on character recognition blocks of an image containing the string of magnetic characters, each block containing an image of one magnetic ink character and the character recognition blocks defining a recognition processing area; and
    a comparison unit configured to compare a first magnetic recognition result obtained from the magnetic recognition unit with a first optical recognition result obtained from the optical recognition unit;
    wherein, when the comparison unit determines that the first magnetic recognition result and the first optical recognition result differ, the optical recognition unit identifies a re-recognition processing area offset in a substantially perpendicular direction with respect to at least a portion of the recognition processing area and performs the optical recognition process again on each character in the re-recognition processing area.

2. A magnetic ink character reading apparatus as recited in claim 1, further comprising:
    a position calculation unit configured to calculate the boundary of the re-recognition area.

3. A magnetic ink character reading method, comprising the steps of:
    (a) acquiring magnetic data from a string of magnetic ink characters on a sheet-type medium;
    (b) processing the magnetic data;
    (c) optically acquiring an image containing the string of magnetic ink characters;

(d) performing optical recognition processing on character recognition blocks of the image, each block containing an image of one magnetic ink character and the character recognition blocks defining a recognition processing area; and (e) comparing a first magnetic recognition result obtained in step (b) with a first optical recognition result obtained in step (d);

wherein, when the first magnetic recognition result and the first optical recognition result differ, the method further includes (f) identifying a re-recognition processing area offset in a substantially perpendicular direction with respect to at least a portion of the recognition processing area and repeating step (d) on each character in the recognition processing area.

4. A magnetic ink character reading method as recited in claim 3, further comprising:

comparing a second optical recognition result obtained in step (f) with a corresponding portion of the first magnetic recognition result.

5. A magnetic ink character reading method as recited in claim 3, wherein the re-recognition processing area is substantially in line with that portion of recognition processing area from which matching first magnetic and optical recognition results were obtained, but is offset from that portion of the recognition processing area from which the first magnetic and optical recognition results differ.

6. A magnetic ink character reading method, comprising the steps of:

(a) acquiring magnetic data from a string of magnetic ink characters on a sheet-type medium;

(b) processing the magnetic data;

(c) optically acquiring an image containing the string of magnetic ink characters;

(d) performing optical recognition processing on character recognition blocks of the image, each block containing an image of one magnetic ink character;

(e) comparing a first magnetic recognition result obtained in step (b) with a first optical recognition result obtained in step (d); and wherein, when the first magnetic recognition result and the first optical recognition result differ, the method further includes (f) calculating a second reading target area offset in a substantially perpendicular direction with respect to at least a portion of a first reading target area on which step (d) was first performed, and performing step (d) again on the second reading target area.

7. A magnetic ink character reading method as recited in claim 6, further comprising:

comparing a second optical recognition result obtained in step (f) with a corresponding portion of the first magnetic recognition result.

8. A magnetic ink character reading method as recited in claim 6, wherein the second reading target area is substantially in line with that portion of the first reading target area from which matching first magnetic and optical recognition results were obtained, but is offset from that portion of the first reading target area from which the first magnetic and optical recognition results differ.

9. A device-readable medium containing a set of instructions adapted to cause a programmable device to execute the magnetic character reading method of claim 3.

10. A device-readable medium containing a set of instructions adapted to cause a programmable device to execute the magnetic character reading method of claim 6.

* * * * *

UNITED STATES PATENT AND TRADEMARK OFFICE
CERTIFICATE OF CORRECTION

PATENT NO. : 7,606,408 B2  Page 1 of 1
APPLICATION NO. : 11/156385
DATED : October 20, 2009
INVENTOR(S) : Yuji Takiguchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1157 days.

Signed and Sealed this

Twelfth Day of October, 2010

David J. Kappos
*Director of the United States Patent and Trademark Office*